(12) United States Patent
Ramachandra et al.

(10) Patent No.: US 10,515,075 B2
(45) Date of Patent: Dec. 24, 2019

(54) METHOD FOR OPTIMIZATION OF IMPERATIVE CODE EXECUTING INSIDE A RELATIONAL DATABASE ENGINE

(71) Applicant: Microsoft Technology Licensing, LLC, Redmond, WA (US)

(72) Inventors: Karthik Saligrama Ramachandra, Madison, WI (US); Kwanghyun Park, Madison, WI (US); Alan Dale Halverson, Verona, WI (US); Conor John Cunningham, Austin, TX (US); Cesar Alejandro Galindo-Legaria, Redmond, WA (US); Kameswara Venkatesh Emani, Mumbai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 15/595,752

(22) Filed: May 15, 2017

(65) Prior Publication Data
US 2018/0329952 A1 Nov. 15, 2018

(51) Int. Cl.
*G06F 17/30* (2006.01)
*G06F 16/2453* (2019.01)
*G06F 16/28* (2019.01)

(52) U.S. Cl.
CPC ...... *G06F 16/24534* (2019.01); *G06F 16/284* (2019.01)

(58) Field of Classification Search
USPC ....... 707/607, 609, 687, 705, 790, 718, 813, 707/821
See application file for complete search history.

(56) References Cited

U.S. PATENT DOCUMENTS

| 7,155,432 B2 | 12/2006 | Eikenhorst et al. |
| 7,617,183 B1 | 11/2009 | Harvey |
| 8,856,151 B2 | 10/2014 | George |
| 9,355,145 B2 | 5/2016 | George |
| 9,454,571 B2 | 9/2016 | Grosse et al. |

(Continued)

FOREIGN PATENT DOCUMENTS

EP    2439656 A1    4/2012

OTHER PUBLICATIONS

Chaudhuri, et al., "Optimization of Queries with User-defined Predicates", In Proceedings of the 22nd VLDB Conference, 1996, pp. 87-98.

(Continued)

*Primary Examiner* — Sana A Al-Hashemi
(74) *Attorney, Agent, or Firm* — Workman Nydegger

(57) ABSTRACT

Processing a database query. A method includes receiving a database query from a user. The database query includes one or more imperative functions. The one or more imperative functions are converted to one or more declarative query representations. The one or more declarative query representations include standardized relational operators included in a relational query language. Further, the one or more declarative query representations are optimizable by a query optimizer of the database. The database query is optimized at the query optimizer to create a query plan by evaluating any declarative query representation originally in the database query received from the user and the one or more declarative query representations.

19 Claims, 6 Drawing Sheets

(56) References Cited

U.S. PATENT DOCUMENTS

| | | | |
|---|---|---|---|
| 10,325,022 | B1* | 6/2019 | Sullivan .............. G06F 17/2785 |
| 2003/0037048 | A1 | 2/2003 | Kabra et al. |
| 2003/0167261 | A1 | 9/2003 | Grust et al. |
| 2005/0160100 | A1 | 7/2005 | Eikenhorst et al. |
| 2006/0015490 | A1* | 1/2006 | Denuit .............. G06F 16/24526 |
| 2009/0112799 | A1 | 4/2009 | Barsness et al. |
| 2015/0220597 | A1 | 8/2015 | Simhadri et al. |
| 2015/0379082 | A1* | 12/2015 | Hu .................... G06F 16/24545 707/718 |
| 2016/0342654 | A1* | 11/2016 | Bendel .............. G06F 16/24542 |

OTHER PUBLICATIONS

Aho, et al., "Compilers: Principles, Techniques, and Tools", In Publication of Addison Wesley; 2nd edition, Sep. 10, 2006.
Byham, et al., "Query Processing Architecture Guide", https://msdn.microsoft.com/en-us/library/mt744587.aspx, Published on: Oct. 26, 2016, 65 pages.
Cheung, et al., "Optimizing database-backed applications with query synthesis", In Proceedings of the 34th ACM SIGPLAN Conference on Programming Language Design and Implementation, Jun. 16, 2013, pp. 3-14.
Kess, et al., "Columnstore indexes—overview", https://msdn.microsoft.com/en-us/library/gg492088.aspx, Published on: Mar. 7, 2016, 7 pages.
Dayal, Umeshwar, "Of Nests and Trees: A Unified Approach to Processing Queries That Contain Nested Subqueries, Aggregates, and Quantifiers", In Proceedings of the 13th International Conference on Very Large Data Bases, Sep. 1, 1987, pp. 197-208.
Delaney, et al., "Microsoft SQL Server 2012 Internals", In Publication of Microsoft Press, Nov. 15, 2013, 189 pages.
Elhemali, et al., "Execution Strategies for SQL Subqueries", In Proceedings of the ACM SIGMOD international conference on Management of data, Jun. 11, 2007, pp. 1-21.
Emani, et al., "Extracting equivalent sql from imperative code in database applications", In Proceedings of the International Conference on Management of Data, Jun. 26, 2016.
Byham, et al., "Create Function (Transact-SQL)", https://docs.microsoft.com/en-us/sql/t-sql/statements/create-function-transact-sql, Published on: Feb. 21, 2017, 36 pages.
Galindo-Legaria, et al., "Orthogonal optimization of subqueries and aggregation", In Proceedings of the 2001 ACM SIGMOD international conference on Management of data, May 21, 2001, pp. 571-581.
Ganski, et al., "Optimization of Nested SQL Queries Revisited", In Proceedings of the 1987 International conference on Management of data, Ma, pp. 23-33.
Graefe, et al., "The Volcano Optimizer Generator: Extensibility and Efficient Search", In Proceedings of the Ninth International Conference on Data Engineering, Apr. 19, 1993, pp. 209-218.
Hecht, et al., "Flow graph reducibility", In Proceedings of the fourth annual ACM symposium on Theory of computing, May 1, 1972.
Kennedy, et al., "Optimizing Compilers for Modern Architectures: A Dependence-based Approach", In Journal of Computers, vol. 35, Issue 4, Mar. 2002, 1 page.
Kim, Won, "On Optimizing an SQL-like Nested Query", In Journal of ACM Transactions on Database Systems, vol. 7, Issue 3, Sep. 1982, pp. 443-439.
Muchnick, Steven S., "Advanced Compiler Design and Implementation", In Publication of Morgan Kaufmann, Sep. 17, 1997.

Hubbard, et al., "Natively Compiled Stored Procedures", https://docs.microsoft.com/en-us/sql/relational-databases/in-memory-oltp/natively-compiled-stored-procedures, Published on: Mar. 14, 2017, 3 pages.
Mishra, Sanjay, "Soften the RBAR impact with Native Compiled UDFs in SQL Server 2016", https://blogs.msdn.microsoft.com/sqlcat/2016/02/17/soften-the-rbar-impact-with-native-compiled-udfs-in-sql-server-2016/, Published on: Feb. 17, 2016, 12 pages.
Seshadri, et al., "Complex Query Decorrelation", In Proceedings of the Twelfth International Conference on Data Engineering, Feb. 1996, pp. 450-458.
Simhadri, et al., "Decorrelation of user defined function invocations in queries", In Proceedings of IEEE 30th International Conference on Data Engineering, Mar. 2014, 12 pages.
Paulley, Glenn, "Performance overhead of SQL user-defined functions", http://glennpaulley.ca/conestoga/2015/07/performance-overhead-of-sql-user-defined-functions/, Published on: Jul. 27, 2015, 6 pages.
Sabin, Simon, "TSQL scalar functions are evil", http://sqlblogcasts.com/blogs/simons/archive/2008/11/03/TSQL-Scalar-functions-are-evil.aspx, Published on: Nov. 5, 2008, 6 pages.
Kornelis, Hugo, "T-SQL User-Defined Functions: the good, the bad, and the ugly", http://sqlblog.com/blogs/hugo_kornelis/archive/2012/05/20/t-sql-user-defined-functions-the-good-the-bad-and-the-ugly-part-1.aspx, Published on: May 20, 2012, 14 pages.
"[AMA] Microsoft databases team—4/8", https://www.reddit.com/r/AZURE/comments/4dtjkt/ama_microsoft_databases_team_48/, Published on: Apr. 7, 2016, 43 pages.
Novick, Andrew, "The Scalar Expression function would speed performance while keeping the benefits of functions", https://connect.microsoft.com/SQLServer/feedback/details/273443/the-scalar-expression-function-would-speed-performance-while-keeping-the-benefits-of-functions, Published on: Apr. 25, 2007, 7 pages.
Heinzelman, Chuck, "Unintended Consequences of Scalar-Valued User Defined Functions", https://blogs.msdn.microsoft.com/sqlcat/2011/06/24/unintended-consequences-of-scalar-valued-user-defined-functions/, Published on: Jun. 24, 2011, 7 pages.
A. Larsen, Gregory, "T-SQL Best Practices—Don't Use Scalar Value Functions in Column List or WHERE Clauses", http://www.databasejournal.com/features/mssql/article.php/3845381/T-SQL-Best-Practices-150-Don146t-Use-Scalar-Value-Functions-in-Column-List-or-WHERE-Clauses.htm, Published on: Oct. 29, 2009, 12 pages.
Cunningham, Conor, "Conor vs. UDFs in Joins", https://blogs.msdn.microsoft.com/conor_cunningham_msft/2010/07/01/conor-vs-udfs-in-joins/, Published on: Jul. 1, 2010, 11 pages.
Sheldon, Robert, "TSQL User-Defined Functions: Ten Questions You Were Too Shy to Ask", https://www.simple-talk.com/sql/sql-training/tsql-user-defined-functions-ten-questions-you-were-too-shy-to-ask/, Published on: May 19, 2014, 32 pages.
Byham, et al., "Deterministic and nondeterministic functions", https://docs.microsoft.com/en-us/sql/relational-databases/user-defined-functions/deterministic-and-nondeterministic-functions, Published on: Sep. 28, 2016, 7 pages.
"Converting Imperative to Declarative", Retrieved from http://wiki.c2.com/?ConvertingImperativeToDeclarative, Nov. 23, 2014, 8 Pages.
Chao, Joy, "Imperative vs. Declarative Query Languages: What's the Difference", Retrieved from: https://neo4j.com/blog/imperative-vs-declarative-query-languages/, Sep. 20, 2016.
International Search Report and Written Opinion Issued in PCT Patent Application No. PCT/US18/027206, dated Jul. 9, 2018, 10 Pages.

* cited by examiner

```
create function service_level(@ckey int)
returns char(10) as
begin
     declare @total float;
     declare @level char(10)
     select @total = sum(o_totalprice)
     from orders where o_custkey=@ckey;

if(@total > 1000000)
          set @level = 'Platinum';

else
          set @level = 'Regular';

return @level
end
```

| Imperative statement | Equivalent relational expression |
|---|---|
| `set @level = 'Regular';` | `select 'Regular' as level;` |
| `select @total = sum(o_totalprice) from orders where o_custkey=@ckey;` | `select (select sum(o_totalprice) from orders where o_custkey=@ckey as level;` |
| `if(@total > 1000000) set @level = 'Platinum';` | `select (case when total > 1000000 then 'Platinum' else NULL end) as level` |

```
1  select null as level,
   (select sum(o_totalprice)
   From orders where o_custkey=@ckey as total
   DT1

2  select (case when total > 1000000
           then 'Platinum'
           else DT1.level end) as level
   DT2

3  select (case when total <= 1000000
           then 'Regular';
           else DT2.level end) as level)
   DT3
```

```
create function service_level(@ckey int)
returns char(10) as
begin
1     declare @total float;
      declare @level char(10)
      select @total = sum(o_totalprice)
      from orders where o_custkey=@ckey;
2     if(@total > 1000000)
          set @level = 'Platinum';
3     else
          set @level = 'Regular';
4     return @level
end
```

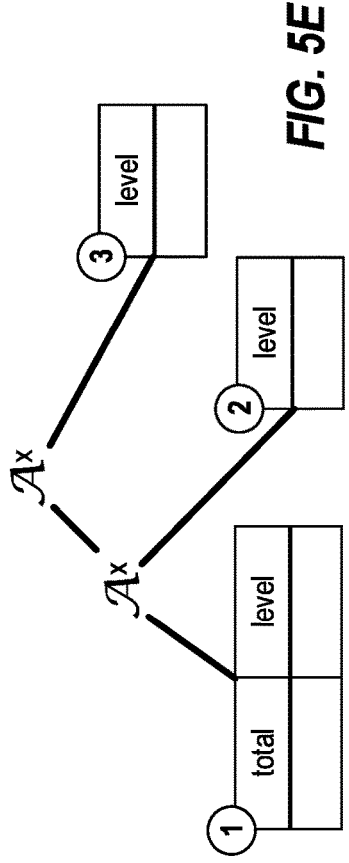

*FIG. 5E*

METHOD FOR OPTIMIZATION OF IMPERATIVE CODE EXECUTING INSIDE A RELATIONAL DATABASE ENGINE

BACKGROUND

Background and Relevant Art

Computers and computing systems have affected nearly every aspect of modern living. Computers are generally involved in work, recreation, healthcare, transportation, entertainment, household management, etc.

Computing systems have often been used to implement relational database systems. To access data in a database system, declarative queries are provided to the database system. Declarative queries, such as SQL queries, generally express a desired outcome in contrast to imperative code which specifies actual imperative functions that should be taken to achieve a desired outcome. The database system typically has a query optimizer that processes the declarative queries to produce code with functions that can achieve the desired outcome.

The database, using the query optimizer, attempts to perform an efficient evaluation of declarative database queries. That is, the database system attempts to optimize how a desired result is achieved by identifying an efficient set and order of functions to achieve the result. However, most databases also support imperative code, for example, in the form of User Defined Functions (UDFs) and stored procedures. That is, a user can provide a query that includes declarative query elements specifying some desired outcomes as well as imperative code specifying some particular functions to be performed by the database.

The evaluation of such code is done in a naive way, and hence is known to be highly inefficient. For example, some systems assign a fixed cost to imperative functions and then perform query optimization based on that cost. However, this can be problematic for a number of different reasons. For example, the actual cost may change over time. For example, if a fixed cost is assigned based on assumptions about technology, and the technology changes (e.g., from rotating disks to solid state disks), the fixed cost may be inaccurate. Alternatively or additionally, the fixed cost may be inaccurate in view of other operations specified by the query optimizer when evaluating declarative queries.

However, imperative functions provide a powerful abstraction to achieve modularity and code reuse, and are a preferred way to express computations in many applications. Thus, it would be useful to be able to include imperative functions in database queries and to have those functions be performed efficiently in the context of a database query.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a database computing environment. The method includes acts for processing a database query. The method includes receiving a database query from a user. The database query includes one or more imperative functions. The one or more imperative functions are converted to one or more declarative query representations. The one or more declarative query representations include standardized relational operators included in a relational query language. Further, the one or more declarative query representations are optimizable by a query optimizer of the database. The database query is optimized at the query optimizer to create a query plan by evaluating any declarative query representation originally in the database query received from the user and the one or more declarative query representations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5D illustrates assignment of variables;

FIG. 5E illustrates a combination of regions; and

DETAILED DESCRIPTION

Figure 1A:
FIG. 1A illustrates a query plan without optimization.

Some embodiments illustrated herein include functionality for optimizing imperative code executing in a relational database engine. The examples illustrated herein are given in the context of User Defined Functions (UDFs) written in T-SQL, available from Microsoft Corporation of Redmond, Wash. and describe a framework to 'inline' them into the calling SQL query.

To accomplish this, when possible, imperative code is converted into an equivalent declarative form that is amenable to cost-based optimization. The declarative form uses standardized relational operators that can be optimized using standardized query optimizers.

Relational databases support evaluation of procedural code in the form of User Defined Functions (UDFs) and stored procedures. These UDFs and procedures provide a powerful abstraction, and are a clean way to achieve modularity and code reuse across SQL queries. They improve readability and maintainability of code, and are a preferred way to express computations in many applications.

As noted previously, while most database systems today support procedural extensions, there has been little focus towards efficient evaluation of procedural code. It is a known fact amongst practitioners that UDFs generally have poor performance considerations.

The main reasons for poor performance are the following.
 Iterative execution: UDFs are invoked in an iterative manner, once per qualifying tuple. This incurs additional costs due to repeated context switching.
 Lack of costing: The query optimizer treats UDFs as inexpensive black boxes and does not cost them currently.
 Limitation on Predicate pushdown: If predicates and expressions are wrapped in a UDF, they cannot be pushed down to the storage engine, since UDFs are black boxes.
 Interpreted execution: UDFs are evaluated as a batch of statements which are executed sequentially. In other words, UDFs are effectively interpreted statement-by-statement. There are no cross-statement optimizations that are carried out.
 Parallelism limitation: Currently, databases do not use intra-query parallelism in queries that have UDF invocations.

In contrast, embodiments herein can significantly improve performance of imperative code running inside a relational database engine by implementing techniques to optimize the imperative code.

In particular, as illustrated in more detail below, embodiments can transform multi-statement UDF definitions into a single relational algebra expression. In some embodiments, this can be done by representing various imperative constructs using standard relational algebra expressions and derived tables, without the use of APPLY or operator-extensions. Additionally or alternatively, embodiments can combine the individual expressions using the APPLY operator and derived tables. Alternatively or additionally, embodiments can use APPLY with probe and passthru for modeling return statements and state of the program across multiple return constructs. Alternatively or additionally, embodiments can simplify and reduce the size/complexity of the relational expression so formed, using simplification rules. Alternatively or additionally, embodiments can avoid redundant computations of predicate expressions while modeling conditional branching statements. Alternatively or additionally, embodiments can incorporate compiler optimizations into the UDF optimization workflow, thereby integrating compiler optimizations such as dead code elimination, constant propagation, dynamic slicing, etc.

Additional details are now illustrated.

Some embodiments use Scalar UDFs to encapsulate complex business rules and utility functions without performance penalties. Scalar UDFs allow developers to encapsulate complex business rules and re-use that logic in different business contexts. While Scalar UDFs provide the benefit of encapsulation and re-usability, performance-related issues drive developers to pursue alternative solutions. For example, consider the following function:

```
create function dbo.FirstDayOfMonth (@Date DATETIME, @Month int)
returns datetime as
begin
    declare @Result datetime
    set @Result = dateadd( day, 1 - datepart( day, @Date ), @Date
)
    if datepart( month, @Result ) <> datepart( month, @Date )
        set @Result = NULL
    declare @mdiff int = @Month - datepart(mm, @Result);
    set @Result = dateadd( mm, @mdiff, @Result)
    return (convert(datetime, convert(nvarchar, @Result, 112)))
end
```

The above function computes the first day of the month for a given date. It is simpler to express this using imperative code as illustrated below:

```
create function dbo.DayOfWeek(@d datetime) returns int as
begin
    return (DATEPART(dw, @d) + @@DATEFIRST -1) % 7
end
```

The above utility function returns the day of the week for a given datetime object. Such utilities are commonly encountered in practice.

Consider the following function:

```
create function [dbo].[fn_FindUserGuid] ( ) returns uniqueidentifier as
begin
    declare @userGuid uniqueidentifier
    if (is_member('AppReaderRole') | is_member('db_owner')) = 1
    begin
        select @userGuid = cast(context_info( ) as uniqueidentifier)
    end
    if @userGuid is null
    begin
        select @userGuid = s.SystemUserId
            from SystemUserBase s
            where s.DomainName = SUSER_SNAME( )
    end
    return @userGuid
end
```

This function tests whether the query is being run by a user with sufficient privileges and returns the corresponding userGUID.

Designers may use scalar UDFs as a mechanism of reuse of scalar valued queries and computations across multiple queries. Scalar UDFs are a simple way to reuse scalar valued sub-queries across multiple queries. To illustrate this scenario, consider a simple example. The xchg_rate function below accepts two currency codes and returns the exchange rate between them. It is quite common to have such a function being used in many queries where this computation is necessary.

```
create function xchg_rate(@from char(3), @to char(3)) returns float
as
begin
    return (select rate from dbo.xchg
            where from_cur = @from
            and to_cur = @to);
end
```

Although this abstraction is desirable, it comes with a severe performance penalty due to reasons mentioned above. This would force developers to avoid writing a function, and instead, duplicate the query in all the places where exchange rate is needed. Subsequently, any change to this query (for example adding another predicate on the column 'as_of' which specifies the conversion rate as of a particular date) would mean changing all the places where this query is embedded.

With inlining, users need not worry about performance and can use functions to reuse such queries.

Scalar UDF inlining transforms single or multi-statement scalar UDFs into scalar expressions or scalar sub-queries that can be substituted in place of the UDF invocation in the query.

For a UDF with a single statement in its body, such as the xchg_rate function shown above, the inlining transformation is straightforward. The body of such a UDF is already a single relational expression, and therefore it can be 'inlined' easily into the calling context. For example, consider a query that prints the customer name, preferred currency and its exchange rate with USD:
select c_name, pref_currency, dbo.xchg_rate(pref_currency, 'USD') from customer Using the scalar UDF inlining feature, the above query would internally be transformed into a form that is equivalent to:

```
select c_name, pref_currency, (select rate from dbo.xchg
                            where from_cur = pref_currency
                            and to_cur = 'USD')
    from customer
```

Such queries are already well-handled by standardized native query optimizers which can decorrelate and simplify the scalar sub-query into a join. In cases where the body of the UDF is not a query but a scalar expression (for example, an arithmetic expression or string operation), a sub-query is not necessary; the scalar expression will be directly substituted in place of the UDF.

Multi-Statement Scalar UDFs

Multi statement UDFs are quite common, and are useful to express functionality using a mix of imperative constructs and database queries. Some examples of multi-statement scalar UDFs are given below. UDFs with multiple statements are transformed into a single relational expression which can be wrapped in a scalar sub-query. This transformation involves the following steps.

1. Divide the UDF body into a hierarchy of "regions" Regions can be either "sequential" or "conditional" regions. Sequential regions are formed of straight-line code with no branching. Conditional regions are formed by IF-ELSE blocks. In some embodiments, regions may also be divided into loop regions, a specialized form of IF-ELSE blocks that repeat until some condition is met.

2. Construct a relational algebraic representation for each region. A variable assignment statement can be transformed into a projection from a constant table, an if-else block can be transformed into a projection with case expressions, etc.

3. Merge the expressions from step 2 into a single relational algebra expression using the APPLY operator.

This expression is wrapped inside a scalar sub-query which is then substituted in place of the UDF. The resulting query plans have similar benefits as described in the single statement case.

The impact of inlining can be seen by looking at the query plans. First, consider a query plan without inlining as shown in FIG. 1A. This is a simple plan, with no parallelism.

Figure 1B:
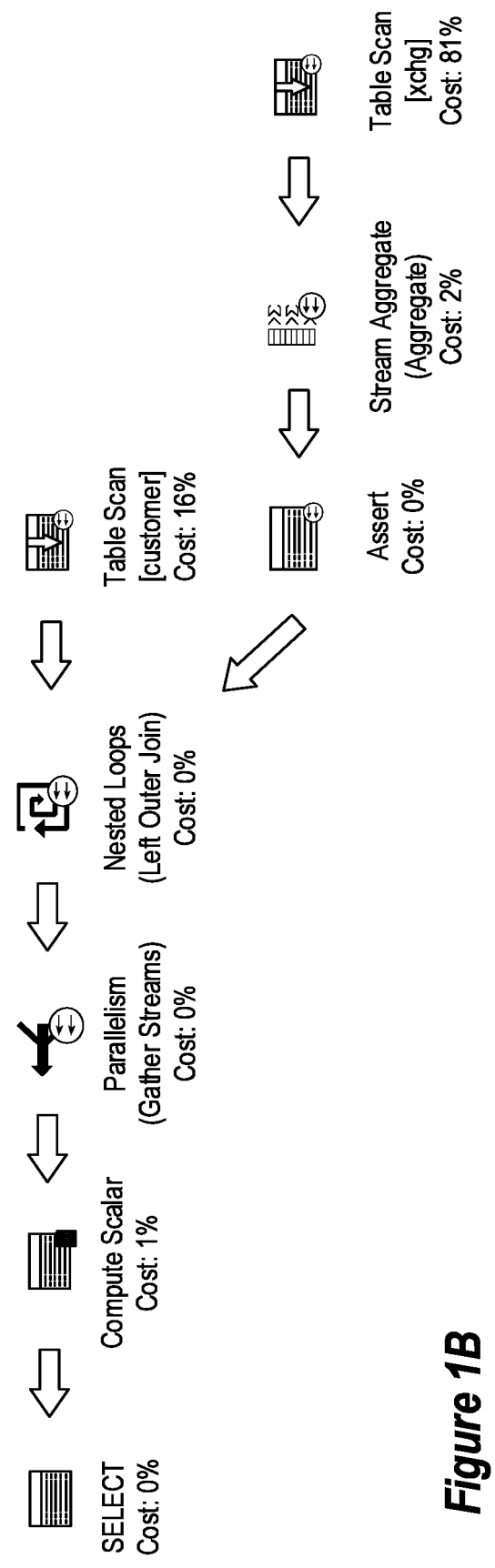
FIG. 1B illustrates a query plan optimized by inlining

Now consider the query plan with inlining turned ON as illustrated in FIG. 1B. In this case, the database has introduced a left outer join between customer and xchg, and is also using parallelism. This is a better plan for several reasons, including but not limited to:

1. Single scan of xchg table for the entire query instead of one scan per customer record
2. Parallelism
3. No UDF invocation overhead, and no mutual recursion from relational engine to scalar expression services and vice versa.

The following now illustrates details with respect to nested UDF inlining. UDFs may invoke other UDFs, or may be recursive as well. The inlining process allows inlining up to a certain depth and stop. The appropriate way to measure depth is to count the number of imperative statements inlined. Based on this count, a limit can be defined and documented.

As described above, inlining can change the query plan shape quite drastically. Preserving the semantics of the UDF is important while performing transformations such as inlining. There are certain cases where the results of the inlined version will deviate from the non-inlined version. These cases are now described.

One such case relates to UDFs that use non-deterministic functions. UDFs can invoke other intrinsic functions, some of which might be non-deterministic. A deterministic function always returns the same value when called with the same input and the same database state. In contrast, non-deterministic functions will return different results when they are called, even if the input is the same and the database state is the same. For example, AVG always returns the same result for the same input and database state. In contrast, GETDATE may return a different result at different invocations, even when the input and database state are the same over the different invocations.

For example, if a UDF invokes the GETDATE function internally, the value of GETDATE returned by the UDF would be different for each invocation of the UDF. However, inlining can change this behavior since it transforms iterative invocation into set-oriented plans in most cases. If users depend upon the distinct values of GETDATE for every invocation, they may see unexpected behavior due to inlining. Therefore, in some embodiments, if any non-deterministic function invocation is encountered in a UDF, embodiments may disable inlining such UDFs.

Consider a simple example:

```
create function dbo.nondet(@c int) returns datetime as
begin
    return GETDATE( );
end
Query 1: select dbo.nondet(c_nationkey) as col1 from customer
Query 2: select GETDATE( ) as col1 from customer
```

Query 1 may return a different value for col1 for different tuples of customer, whereas query 2 will compute GETDATE( ) once for the entire query and use the same value. Query 1 with inlining will essentially behave like query 2, and hence will be different from query 1 without inlining.

Another case where the results of the inlined version will deviate from the non-inlined version is related to differences due to implicit type conversions. SQL Server® and other database offerings perform implicit type conversions for parameters and return types of the UDF when the types of the actual values are different from the declared types. As a safe approach, embodiments may insert explicit type conversions to declared types while inlining (this includes declared types for parameters and the return value). This may lead to differences in the result set schema. Consider the following example:

```
create function dbo.fn_query(@bid int) returns varchar(70) as
begin
    return (select name from bands where id = @bid)
end
Query: select dbo.fn_query(id) as udf_result from bands
```

The name attribute of the bands table is of type varchar (50). The return type of the function is varchar(70). Without inlining, the query result attribute "udf_result" will have the type varchar(50). Although this is subsumed by varchar(70), it is technically not accurate.

With inlining, the result attribute will have the type varchar(70) which is as declared in the UDF. This is because embodiments insert an explicit type conversion operator on the result attribute. Technically the inlined version is more accurate than the non-inlined version here. Since there is no deviation from the correct semantics in this case, these differences can remain, but may be documented.

The following now illustrates an architecture that may be used in some embodiments of the inventions.

Figure 2:
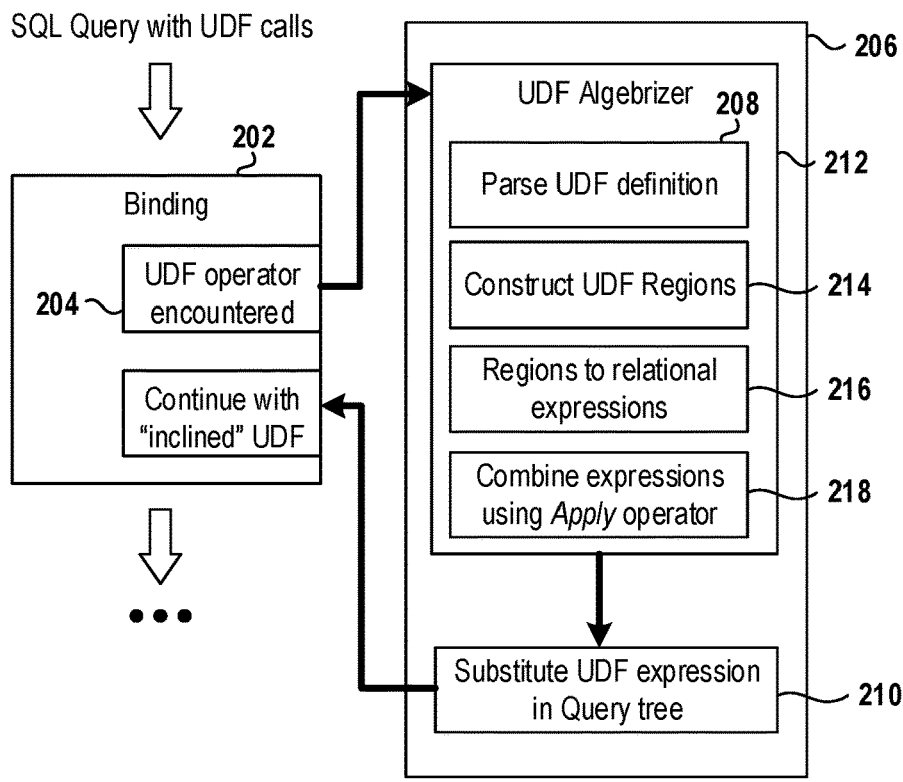
FIG. 2 illustrates a process for optimizing UDFs for use in database query plans.

Like view substitution, inlining of scalar UDFs is done in some embodiments during algebrization. The high-level architecture of this feature is illustrated in FIG. 2. As shown in FIG. 2, as part of binding 202, whenever a scalar UDF operator is encountered as illustrated at 204, the inlining process 206 is invoked. After performing the necessary precondition checks, the UDF definition is parsed as illustrated at 208. Then, the UDF is algebrized into a single relational algebraic expression and attached to the query in place of the scalar UDF operator as illustrated at 210. Then the rest of the binding process continues as before.

The approach to inlining scalar UDFs, in the illustrated example, involves two steps as illustrated in FIG. 2.

1. UDF Algebrization (as illustrated at 212): Build a single relational algebraic expression equivalent to the entire UDF.

2. Substitution (as illustrated at 210): Attach this expression to the calling query, substituting it in place of the scalar UDF operator.

These two steps are now described in more detail.

The following illustrates details with respect to UDF algebrization (as illustrated at 212). As described previously, the goal of this step is to build a single relational algebraic expression which is semantically equivalent to the intent of the UDF. This step involves transforming imperative constructs into corresponding relational expressions and combining them in a way that strictly adheres to the procedural intent of the UDF. The approach involves the following steps.

1. Divide the UDF body into a hierarchy of program "regions" (as illustrated at 214). Regions can be "sequential" regions, "conditional" regions, or "loop" regions. Sequential regions are formed of straight-line code with no branching. Conditional regions are formed by IF-ELSE blocks.

2. Construct a relational algebraic representation for each region (as illustrated at 216). A variable assignment statement can be transformed into a projection from a constant table, an if-else block can be transformed into a projection with case expressions etc.

3. Merge the expressions from step 2 into a single relational algebra expression using the APPLY operator (as illustrated at 218). Some embodiments use the OUTER APPLY operator to build a left deep tree of APPLY operators. For example, if DT1, DT2, DT3, DT4 are the relational expressions for consecutive blocks, the merged expression would look like ((DT1 OUTER APPLY DT2) OUTER APPLY DT3) OUTER APPLY DT4.

During the above procedure, if a construct that is not supported is encountered, the inlining is aborted.

The following now illustrates details with respect to substitution as illustrated at 210.

Once a single expression for a UDF is built, a scalar UDF can be mapped to a scalar valued sub query. The subquery itself is the single expression for the UDF described earlier. SQL Server®, and other database offerings, have sophisticated query optimizer rules to optimize subqueries, which can be then exploited. Therefore, embodiments transform a query that contains a UDF invocation into an equivalent one that has a scalar valued subquery, thereby "inlining" the UDF. In some embodiments, this transformation is done during algebrization.

Note that during substitution phase, the formal parameters of the UDF are replaced by the actual parameters that originate from the calling context.

The following now illustrates additional details. First the relevant classes and data structures are described along with the inlining process. Later, some special cases are analyzed and approaches for handling them are described.

The following illustrates details with respect to various data structures. In Sparticular, the major classes designed for scalar UDF inlining are described.

Block Classes

Figure 3:
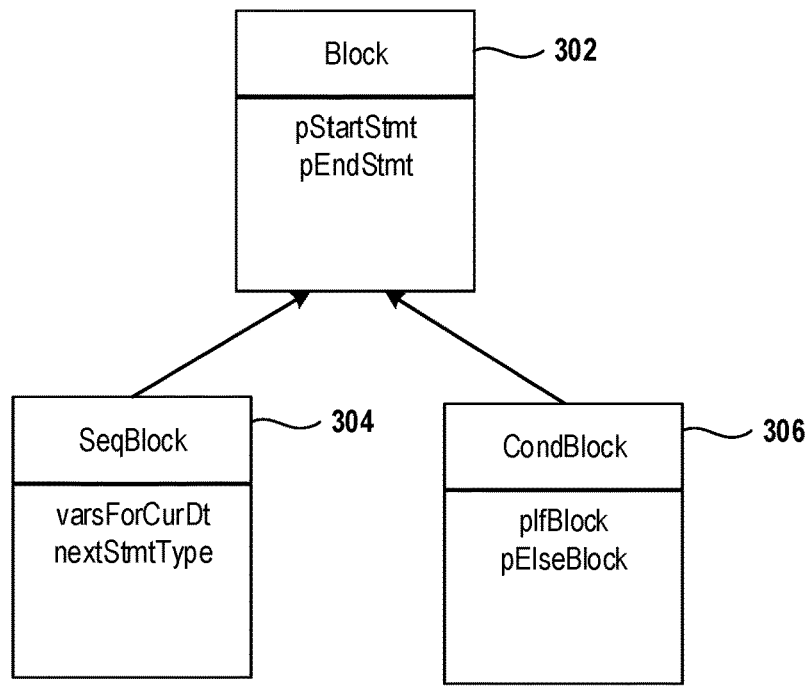
FIG. 3 illustrates classes used in some embodiments for optimizing UDFs.

FIG. 3 illustrates the classes used to model program regions in the UDF definition. The Block class 302 is virtual and serves as a common base class for the two kinds of regions illustrated in the example.

SeqBlock 304: Represents a sequential region (sequence of statements with no conditional branching).

CondBlock 306: Represents a conditional region (IF-ELSE blocks)

Figures 4, 5A:
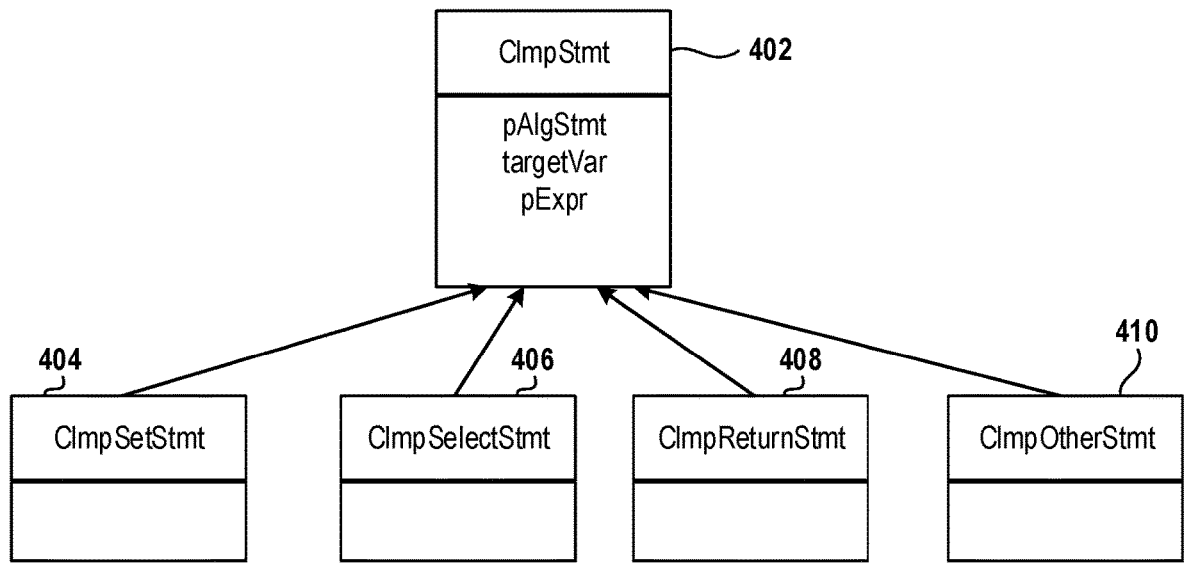
FIG. 4 illustrates classes used to model imperative statements in a UDF.
FIG. 5A illustrates a function including one or more UDFs.

The following illustrates details with respect to Imperative Statement Classes. FIG. 4 illustrates the classes used to model different imperative statements in the UDF definition.

The CImpStmt class 402 is a common base class for the statements representing various imperative constructs. It essentially wraps a CAlgStmt which it represents, and also has other data members for the target variable that it writes to, and the expression corresponding to that statement.

The subclasses of the CImpStmt class 402, namely: the CImpSetStmt class 404, the CImpSelectStmt class 406, the CImpReturnStmt class 408, model SET, SELECT and RETURN statements respectively. The CImpOtherStmt class 410 represents other classes that may be implemented.

The high-level process for inlining UDFs is as follows:

At the point when a Scalar UDF is bound (CScaOp_UDF::BindSelf), the following steps are performed:

1. The preconditions for inlining are checked; the process terminates if any of them fail.

2. The UDF object is initialized and parsed (see FIG. 2 at 212).

3. The list of CAlgStmt objects (the output of parsing) forms the input to the inlining process. The entry point of this process is CScaOp_UDF::ConstructApplyExpr. (Described next)

4. The output of this process is a relational expression tree. The expression is a scalar subquery that contains the relational expression for the entire UDF body.

5. The formal parameters used in the UDF body expression (the UDF context) are replaced by actual parameters from the calling query (the calling context).

6. The UDF node in the calling query is replaced by the scalar subquery node i.e. the output of the transformation.

Inlining Process

The following illustrates an inlining process using a simple example given below. Referring now to FIG. 5A, a function 500 is illustrated.

The list of CAlgStmt objects representing the body of the UDF forms the input to this process. The process proceeds as follows.

1. If the UDF is a single statement UDF, and the statement does not have an SQL query, then creating a scalar sub-query is avoided. In such cases, the return expr (the input to ExprQuery) is directly substituted as the scalar expression in place of the UDF operator. The process terminates in this case, and proceeds to the substitution phase.

Figures 5B, 5C:
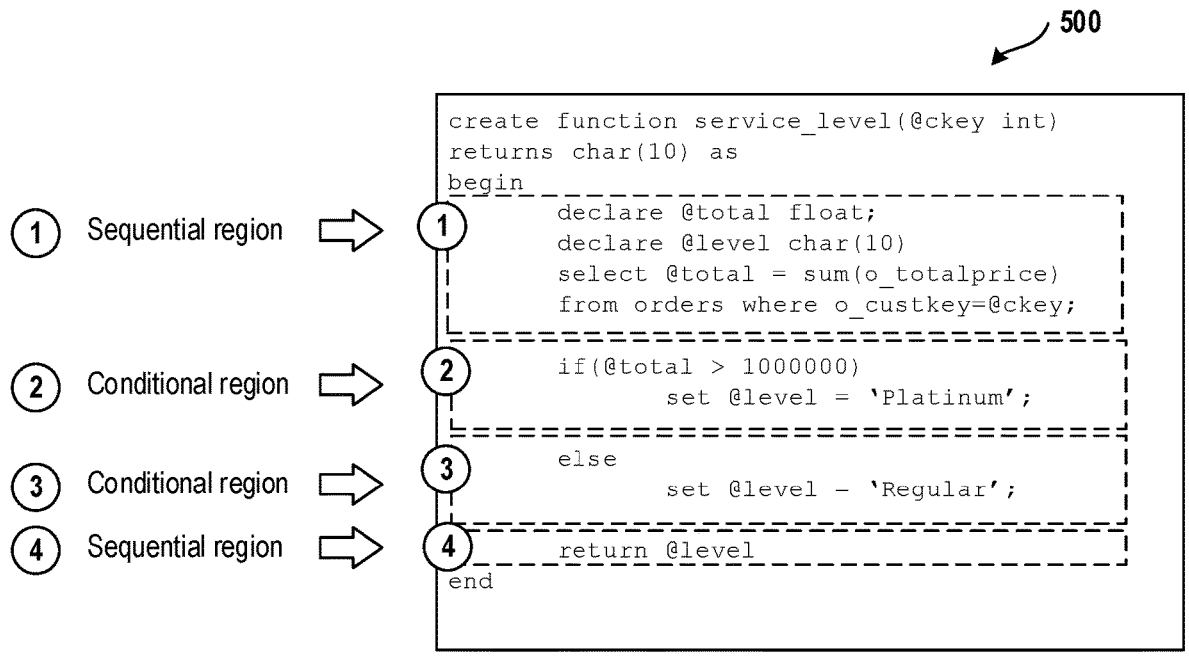
FIG. 5B illustrates identification of various regions of the function including one or more UDFs.
FIG. 5C illustrates conversion of imperative UDF statements to equivalent relational expressions.

2. A SeqBlock representing the entire body of the UDF is created, and the process proceeds to construct a scalar sub-query for this SeqBlock. Internally, a hierarchy of regions is created, by using the SeqBlock to model basic block regions and CondBlock to model conditional regions. The regions for the example illustrated in FIG. 5A are shown in FIG. 5B.

3. The process loops over the statements of the UDF, and creates relational expressions. Some examples of this transformation are given below. Note that the examples are shown in FIG. 5B in SQL syntax, but the transformations are done on the algebrizer tree.

4. These expressions are combined into derived tables for each region. The schema of this derived table is essentially the set of all variables that are assigned to, in that region, as illustrated in FIG. 5D.

5. Then, these derived tables are combined using the Apply operator as illustrated in FIG. 5E.

6. This expression is wrapped within a CScaOp_SubQuery node and returned.

Return statements denote the end of function execution and provide the value that needs to be returned from the function. A UDF may have multiple return statements, one per code path in the function. Embodiments model return statements as assignments to an implicit variable which is illustrated herein as retVal followed by an unconditional jump to the end of the function. The return type of the UDF forms the data type of this variable. The retVal variable is implicitly declared with an initial value of NULL at the beginning of the UDF. Any subsequent occurrence of a return statement is treated as an assignment to the already defined retVal variable.

Semantically, this unconditional jump means that no statement should be evaluated once the variable retVal has been assigned a valid return value (note that NULL could also be a valid return value). This is handled by using the pass-through functionality of the Apply operator. An implicit variable illustrated herein as retState is used to denote whether retVal has been assigned, and the pass-through predicate ensures that subsequent operations are executed only if retVal has not yet been assigned.

Note that this behavior could be expressed using case expressions without using pass-through. However, there are two disadvantages of using case expressions to implement unconditional jumps for return statements. First, it increases the size and complexity of the resulting expression (the resulting expression could end up very huge and complex, depending upon the number of return statements in the UDF). This is because, all successor regions of a return statement would need to be wrapped within a case expression. Another disadvantage is that the introduction of case expressions hinders the possibility of scalar expression simplification.

The following illustrates details with respect to cost-based inlining.

Deciding whether inlining of UDFs should be cost-based or not influences the choice of whether inlining should be performed during Query Optimization (QO) or during binding. If inlining is to be a cost-based decision, it is performed during QO. If not, it can be done during binding. There are trade-offs to both these design alternatives. One of the main advantages to doing inlining during binding is that it is non-intrusive—the QO and other phases of query processing require no modifications. On the other hand, inlining during QO has the advantage of considering the inlined UDF as an alternative, and making a cost-based decision of whether to inline or not.

Performing inlining during binding is non-intrusive, requiring no changes to the query optimizer. Additionally, certain optimizations such as folding are currently performed during binding. Inlining during QO would require re-triggering these mechanisms explicitly.

The following illustrates some limits of inlining. Although inlining improves performance in most cases, there are certain cases where it might be less desirable. Inlining can substantially increase the size and complexity of the resulting query. For example, inlining a UDF with thousands of lines of code is not desirable as it would lead to a query tree with tens of thousands of operators. Additionally, note that the query invoking the UDF might itself be complex as well. Optimizing such a huge input tree makes the job of the query optimizer very hard. The space of alternatives to consider would increase significantly.

This has an impact on optimization time, and also on the quality of the plan chosen. Therefore, one of the constraints that may be imposed is to restrict the size of inlined query tree. In turn, this restricts the size of UDFs that are inlined. Some embodiments may include algebraic transformations that simplify the inlined query tree thereby reducing its size whenever possible.

The following illustrates examples related to nested and recursive UDFs. Inlining transformations can result in arbitrarily deep and complex trees (in the case of deeply nested function calls), or never terminate at all (in the case of recursive UDFs), if inlining is not managed appropriately. Also, note that it is not trivial to detect recursion, since it may involve multiple nested function calls with mutual recursion.

Some embodiments may implement the notion of 'inlining depth'. The inlining depth could be maintained and incremented every time a nested UDF is inlined. With a threshold value for the maximum inlining depth, embodiments can control the complexity of inlining deeply nested function calls. A more suitable approach to control the complexity would be to control the inlining depth based on the size of the inlined tree. This would allow deeper nestings of smaller UDFs and shallow nestings of larger UDFs.

For example, in one example embodiment, the max inlining depth is defined to be 3. Therefore, irrespective of whether it is recursive or not, this example inlines to a depth of 3 and stops. Note that if there is a deep nesting of large UDFs, inlining a few levels might still leave a UDF in the query. Although this still is beneficial in terms of reducing function call overheads and enabling the choice of set-oriented plans, it does not overcome the limitation on parallelism.

The following illustrates some special cases and implications on other aspects of query processing.

Since UDF inlining is done as part of query compilation, there could be an increase in compilation time. However, the impact of this increase may be heavily offset by the performance gains during execution. Also, due to caching of compiled plans, this overhead is negligible in many workloads.

Some embodiments perform the inlining transformations at function create/alter time, and store the relational equivalent of the UDF along with its metadata. With that, query compilation overheads can be further reduced.

The following illustrates how UDF permissions are respected with inlining.

1. Consider a user that does not have "execute" permissions on the UDF, but has "select" permissions on the referenced tables. Such a user will be able to run this query, even though it should be disallowed. To avoid such cases, embodiments may enlist the UDF for permission checks, even if it was inlined.

2. A user may have "execute" permission on the UDF, but no "select" permissions on the tables that the UDF references. In such a case, by inlining, there may be a situation where that user is unable to run the query even if it should be allowed.

The following illustrates some implications of this feature on the plan Scache.

Consider a case where a user has both the "execute" permissions over a S<UDF and "select" permissions on the underlying tables. Such a user may run a query involving this UDF, and consequently, the "inlined" plan is cached. Subsequently, if a user who does not have "execute" permissions on the UDF but has "select" permissions on the underlying tables runs the same query, the cached plan will run successfully, even though it shouldn't.

This problem is solved by enlisting the UDF in permission checks, even if it was inlined. This is because permission checks are done during execution.

The following illustrates details regarding managing metadata version changes and plan cache invalidation. Consider the case as described above, where an "inlined" plan is cached. Now, if the user runs an ALTER FUNCTION or DROP FUNCTION statement, the UDF is changed, or no longer available. But the cached "inlined" still has the "old" version of the UDF. Therefore, this query can be removed from the plan cache. Again, this problem is solved by enlisting the UDF in schema/permission checks, even if it was inlined.

The following illustrates details with respect to type conversions. SQL Server® (and other database offerings) performs implicit type conversions and casts when the datatypes of parameters and the returned expressions are different from the declared types of the UDF. To preserve the semantics as before, embodiments may insert type casts for the return expression and all the parameters.

The following illustrates details with respect to UDF options. SQL Server® (and other database offerings) supports passing additional options to functions such as "RETURNS NULL ON NULL INPUT". This option is handled by adding an additional conditional expression on the UDF expression, that checks if any of the parameters are NULL, and returns NULL if so.

The following illustrates details with respect to error handling. The process for inlining is implemented in a defensive manner. Inlining is a best-effort optimization, and if for any reason the inlining process throws an error, embodiments can terminate the inlining and proceed to bind the UDF without inlining.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
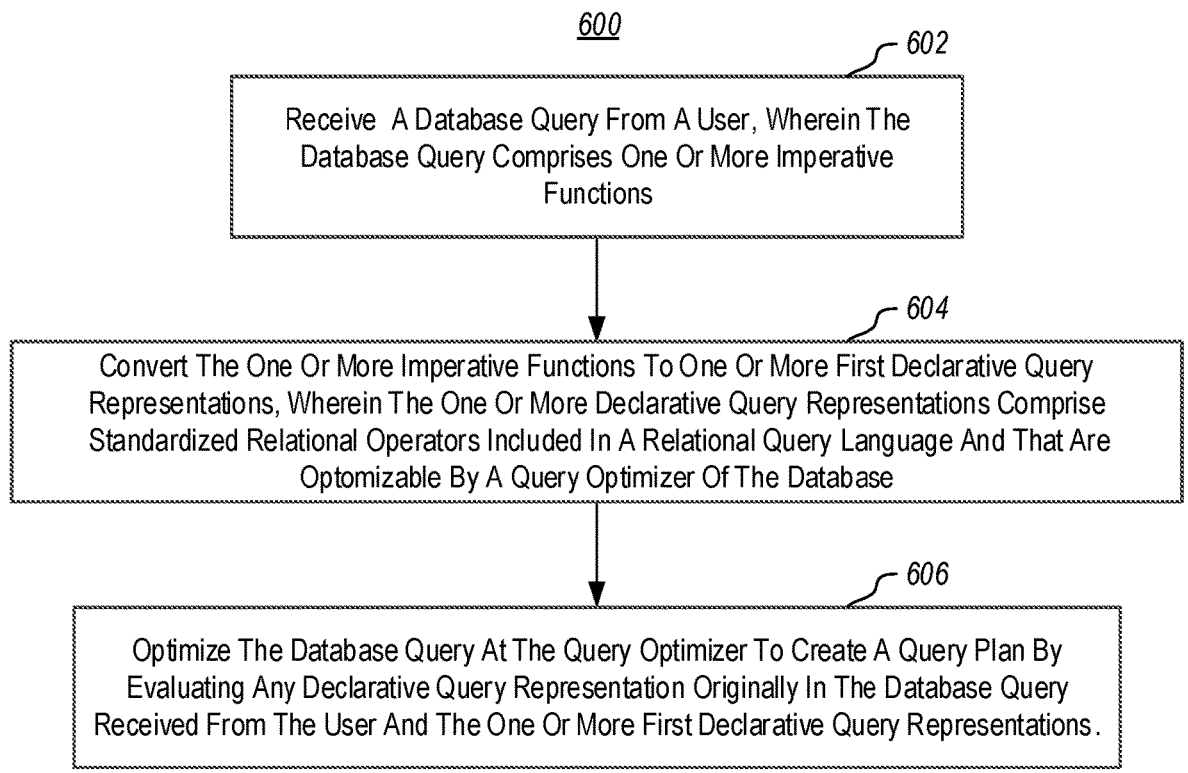
FIG. 6 illustrates a method of handling a database query.

Referring now to FIG. 6, a method 600 is illustrated. The method 600 may be practiced in a database computing environment. The method 600 includes acts for processing a database query.

The method includes receiving a database query from a user, wherein the database query comprises one or more imperative functions (act 602). For example, one or more imperative functions may be included as UDFs.

The method further includes converting the one or more imperative functions to one or more declarative query representations, wherein the one or more declarative query representations comprise standardized relational operators included in a relational query language and that are optimizable by a query optimizer of the database (act 604).

The method further includes optimizing the database query at the query optimizer to create a query plan by evaluating any declarative query representation originally in the database query received from the user and the one or more declarative query representations (act 606).

The method 600 may be practiced where the declarative query representation includes a set based relational algebra tree. In some embodiments, the set based relational algebra tree includes one or more SPJ (Select-Project-Join) blocks, which are coarse sets of functions. In an alternative embodiment, the set based relational algebra tree includes one or more individual functions, which are more fine grained functions.

The method 600 may be practiced where the declarative query representation comprises a set based relational algebra tree and one or more references to imperative functions.

The method 600 may further include dividing the one or more imperative functions into regions. In some such embodiments, each region comprises a sequential region type, a conditional region type or a loop region type. In some such embodiments, converting the one or more imperative functions to the one or more declarative query representations is performed based on an associated region type, such that each region is converted to a relational expression. Some such embodiments may further include combining a number of different relational expressions into a single relational expression. Alternatively or additionally, some such embodiments may include substituting one or more of the relational expressions back into the database query received from the user. Alternatively or additionally, some such embodiments may be practiced where converting the one or more imperative functions to the one or more declarative query representations comprises mapping a variable declaration function in a sequential region to a select expression. Alternatively or additionally, some such embodiments may be practiced where converting the one or more imperative functions to the one or more declarative query representations comprises mapping a function in a conditional region to a case expression.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for processing database queries, the computer system comprising:
   one or more processors; and
   one or more computer-readable media having stored thereon instructions that are executable by the one or more processors to configure the computer system to process database queries, including instructions that are executable to configure the computer system to perform at least the following:
      receive a database query from a user, wherein the database query comprises one or more imperative functions;
      convert each of the one or more imperative functions to a single relational expression, the converting each corresponding imperative function comprising:
         dividing the corresponding imperative function into a plurality of regions based on hierarchy;
         for each region of the plurality of regions, constructing a relational expression; and
         combining the plurality of relational expression into a single relational expression, wherein the single relational expression optimizable by a query optimizer of the database; and
      optimize the single relational expression at the query optimizer to create a query plan corresponding to the database query received from the user.

2. In a database computing environment, a method of processing a database query, the method comprising:
   receiving a database query from a user, wherein the database query comprises one or more imperative functions;

converting each of the one or more imperative functions into a single relational expression, the converting each corresponding imperative function comprising:
  dividing the corresponding imperative function into a plurality of regions based on hierarchy;
  for each region of the plurality of regions, constructing a relational expression; and
  combining the plurality of relational expressions into a single relational expression, wherein the single relational expression is optimizable by a query optimizer of the database; and
optimizing the single relational expression at the query optimizer to create a query plan corresponding to the database query received from the user and the one or more declarative query representations.

3. The computer system of claim 1, wherein the single relational expression is a declarative query representation that comprises a set based relational algebra tree.

4. The computer system of claim 1, wherein the single relational expression is a declarative query representation that comprises a set based relational algebra tree and one or more references to imperative functions.

5. The computer system of claim 1, wherein the one or more computer-readable media further have stored thereon instructions that are executable by the one or more processors to configure the computer system to divide the one or more imperative functions into regions, wherein each region comprises a sequential region type, a conditional region type or a loop region type, and wherein converting each of the one or more imperative functions to the a relational expression is performed based on an associated region type.

6. The method of claim 2, wherein the signal relational expression comprises a set based relational algebra tree.

7. The method of claim 2, wherein each region comprises a sequential region type, a conditional region type or a loop region type, and wherein converting each of the one or more imperative functions to a relational expression is performed based on an associated region type.

8. The computer system of claim 3, wherein the set based relational algebra tree comprises one or more SPJ blocks.

9. The computer system of claim 3, wherein the set based relational algebra tree comprises one or more individual functions.

10. The computer system of claim 5, wherein the one or more computer-readable media further have stored thereon instructions that are executable by the one or more processors to configure the computer system to combine a number of different relational expressions into a single relational expression.

11. The computer system of claim 5, wherein the one or more computer-readable media further have stored thereon instructions that are executable by the one or more processors to configure the computer system to substitute one or more of the relational expressions back into the database query received from the user.

12. The computer system of claim 5, wherein converting each of the one or more imperative functions to a relational expression comprises mapping a variable in a sequential region of an imperative function to a select relational expression.

13. The computer system of claim 5, wherein converting each of the one or more imperative functions to a relational expression comprises mapping a function in a conditional region of an imperative function to a case relational expression.

14. The method of claim 6, wherein the set based relational algebra tree comprises one or more SPJ blocks.

15. The method of claim 6, wherein the set based relational algebra tree comprises one or more individual functions.

16. The method of claim 7, further comprising combining a number of different relational expressions into a single relational expression.

17. The method of claim 7, further comprising substituting one or more of the relational expressions back into the database query received from the user.

18. The method of claim 7, wherein converting each of the one or more imperative functions to a relational expression comprises mapping a variable in a sequential region to a select expression.

19. The method of claim 7, wherein converting each of the one or more imperative functions to a relational expression comprises mapping a function in a conditional region to a case expression.

* * * * *